(12) United States Patent
Wu

(10) Patent No.: US 9,237,314 B2
(45) Date of Patent: Jan. 12, 2016

(54) SURVEILLANCE SYSTEM CAPABLE OF SAVING POWER

(71) Applicant: HON HAI PRECISION INDUSTRY CO., LTD., New Taipei (TW)

(72) Inventor: Chiung-Sheng Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 290 days.

(21) Appl. No.: 13/851,913

(22) Filed: Mar. 27, 2013

(65) Prior Publication Data

US 2013/0286202 A1 Oct. 31, 2013

(30) Foreign Application Priority Data

Apr. 25, 2012 (TW) .............................. 101114624 A

(51) Int. Cl.
*H04N 7/18* (2006.01)
*H04N 5/225* (2006.01)
*G08B 13/196* (2006.01)
(Continued)

(52) U.S. Cl.
CPC ................ *H04N 7/18* (2013.01); *G08B 29/181* (2013.01); *H04N 5/23241* (2013.01); *G08B 13/19602* (2013.01); *H04N 7/183* (2013.01)

(58) Field of Classification Search
CPC .............. H04N 5/225; H04N 21/4223; H04N 5/23212; H04N 5/2353; G08B 13/19608; G08B 13/19602; G08B 13/196; G06T 2207/30232; G06T 5/50; G06T 7/20; G06T 2207/10004; G06T 2207/20224; G06T 7/0044
USPC ......................................................... 348/143
See application file for complete search history.

(56) References Cited

U.S. PATENT DOCUMENTS 7,271,830 B2 * 9/2007 Robins ............. G08B 13/19663
348/208.6
2002/0196330 A1 * 12/2002 Park .................. G08B 13/19608
348/49

(Continued)

FOREIGN PATENT DOCUMENTS

WO   WO 2011001005 A1 *  1/2011  ............. G03B 15/16

OTHER PUBLICATIONS

M.C. Waldon, Low Power Image Based Triggering for Extended Operation Surveillance, Master's Thesis, Massachusetts Institute of Technology, Jun. 2004. (Secured copy from MIT, unable to provide reference. Please visit MIT library to obtain a copy of the document (preview, non-printable—open to all).*

*Primary Examiner* — Jamie Atala
*Assistant Examiner* — Richard A Hansell, Jr.
(74) *Attorney, Agent, or Firm* — Novak Druce Connolly Bove + Quigg LLP

(57) ABSTRACT

A surveillance system includes a video capturing device and a power controller. The video capturing device includes an auto focusing module, an auto exposure module, and an auto white balance module. The video capturing device captures a number of images in a first time interval and also captures a number of images in a second time interval next to the first time interval. The power controller includes an object detecting module and a switching module. The object detecting module detects whether there is a moving object in the images captured in the first time interval. The switching module switches off the auto focusing module, the auto exposure module, and the auto white balance module in the second time interval when the objecting detecting module detects that there is no moving object.

10 Claims, 4 Drawing Sheets

(51) Int. Cl.
*H04N 5/232* (2006.01)
*G08B 29/18* (2006.01)

(56) References Cited

U.S. PATENT DOCUMENTS

| | | | | |
|---|---|---|---|---|
| 2004/0212678 | A1* | 10/2004 | Cooper | G08B 13/19602 348/155 |
| 2005/0276464 | A1* | 12/2005 | Duquette | G06K 9/00 382/151 |
| 2007/0025722 | A1* | 2/2007 | Matsugu | G03B 17/16 396/263 |
| 2010/0053358 | A1* | 3/2010 | Kodama | G06T 7/204 348/222.1 |
| 2011/0032375 | A1* | 2/2011 | Kawano | H04N 1/2112 348/222.1 |
| 2012/0257071 | A1* | 10/2012 | Prentice | H04N 5/2625 348/220.1 |
| 2012/0307091 | A1* | 12/2012 | Yumiki | H04N 5/23203 348/211.4 |

* cited by examiner

SURVEILLANCE SYSTEM CAPABLE OF SAVING POWER

BACKGROUND

1. Technical Field

The present disclosure relates to surveillance systems, and particularly to a surveillance system capable of saving power.

2. Description of the Related Art

Surveillance devices typically include a video capturing device having functions of auto focusing, auto exposure, and auto white balance, which are activated when the surveillance devices are turned on to ensure surveillance quality. However, one may desire to turn off the functions when the surveillance device monitors a single static scene to save power.

Therefore, it is desirable to provide a surveillance system thereof, which can overcome the above-mentioned problem.

DETAILED DESCRIPTION OF THE EMBODIMENTS

Figure 1:
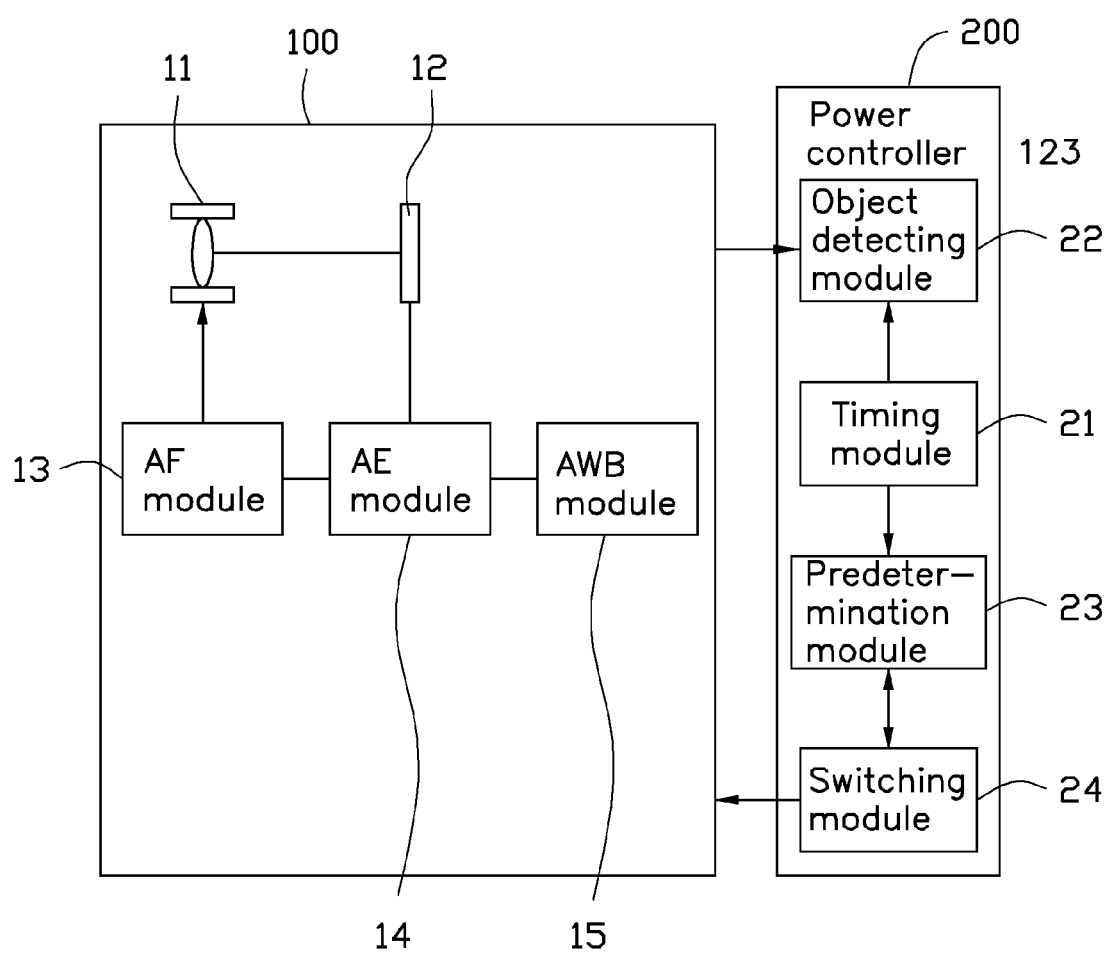
FIG. 1 is a functional block diagram of a surveillance system capable of saving power, according to an exemplary embodiment.

FIG. 1 shows a surveillance system 10, according to an exemplary embodiment. The system 10 includes a video capturing device 100 and a power controller 200.

The video capturing device 100 can be mounted indoor or outdoor and is used to captures video of an area. When the video capturing device 100 is switched on, the video capturing device 100 captures a number of consecutive images. The video capturing device 100 includes a lens module 11, an image sensor 12, an auto focusing (AF) module 13 for achieving AF function, an auto exposure (AE) module 14 for achieving AE function, and an auto white balance (AWB) module 15 for achieving AWB function. Light from objects passes the lens module 11 and projects on the image sensor 12 to form images. The image sensor 12 can be a charged-couple device (CCD) or a complementary metal oxide semiconductor (CMOS).

The power controller 200 is electrically connected to the video capturing device 100 and includes a timing module 21, an object detecting module 22, a predetermination module 23, and a switching module 24. The timing module 21, the object detecting module 22, the predetermination module 23, and a switching module 24 may be computerized software instructions and can be executed by the power controller 200.

Figure 2:
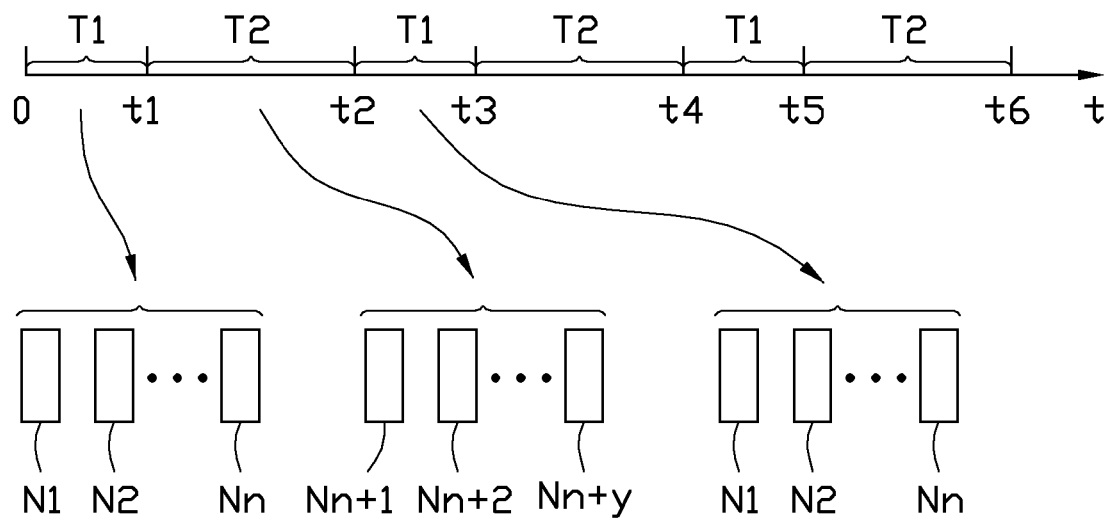
FIG. 2 is a schematic view showing a shooting process of the surveillance system for capturing images.

As shown in FIG. 2, when the video capturing device 100 is turned on, the video capturing device 100 starts to obtain images along a time axis t. The timing module 21 calculates time when the capturing device 10 starts to capture images from the moment t0. The timing module 21 divides the time axis t to a number of sequential time intervals T1 and T2. Each second time interval T2 is next to a corresponding first time interval T1. For example, from the moment t0 to the moment t1 is a first time interval T1, from the moment t1 to the moment t2 is a second time interval T2, from the moment t2 to the moment t3 is another first time interval T1, and from the moment t3 to the moment t4 is another second time interval T2. In the embodiment, a length of each first time interval T1 is one third of a length of each second time interval T2. For example, the length of each first time interval T1 is one second and the length of the second time interval is three seconds.

The image capturing device 100 simultaneously switches on the AF module 13, the AE module 14, and the AWB module 15 in each first time interval T1 and sequentially captures N number of images, namely a first image N1, a second image N2 to an N-th image Nn in each first time interval T1. The video capturing device 100 also sequentially captures Y number of images in each second time interval T2, namely an N+1-th image Nn+1, an N+2 image Nn+2 to an Nn+y-th image Nn+y. In the embodiment, N and Y are positive integers. In one example, N can be five and Y can be fifteen. Each pixel of each of the N number of images is represented by values of red, green, and blue.

The object detecting module 22 detects moving objects from the N number of images in each first time period T1.

The object detecting module 22 selects the first image of the N number of images as a reference image and processes the other N−1 number of images. In the embodiment, the object detecting module 22 sequentially processes the other N−1 number of images as follows: differentiating the other N−1 number of images relative to the reference image; graying the differentiated N−1 number of images; binarizing the grayed N−1 number of images; blurring the binarized N−1 number of images; dilating the blurred N−1 number of images; detecting edges from the dilated N−1 number of images to extract the edges from each dilated image; rebinarizing the N−1 number of images after edges are detected (that is, the object detecting module 22 binarizes the N−1 number of images for a second time); and detecting objects from the rebinarized N−1 number of images. In alternative embodiments, any one of the N number of images can be selected as the reference image.

Differentiating the N−1 number of images relative to the reference image means to obtain value differences between each image of the N−1 number of images and the reference image. The value differences are obtained by each pixel value of each image of the N−1 number of images deducting each pixel value of the reference image and then taking absolute values. Each pixel value of the N number of images is initially represented by the values of red, green, and blue.

Graying the differentiated N−1 number of images means to convert each differentiated image to a gray image, namely, each pixel value of each differentiated image is represented by a luminance value instead of being represented by the values of red, green, and blue.

Binarizing the grayed N−1 number of images means to compare the luminance value of each pixel of each grayed image to a first predetermined threshold. If the luminance value of each pixel of each grayed image is equal to or greater than the first predetermined threshold, the luminance value of each pixel of each grayed image is set to be 255, if the luminance value of each pixel of each grayed image is less than the first predetermined threshold value, the luminance value is set to be 0. The first predetermined threshold can be, and in one example is, 125.

Blurring the N−1 number of binarized images means defining a pixel whose luminance value is set at 255 of each binarized image as a center pixel, and then determining luminance values of eight other pixels surrounding the center pixel. If there are at least two pixels of the eight pixels which have luminance values set at 255, the luminance value of all the pixels in the eight pixels is set to be 255, otherwise the luminance value of all the eight pixels, and the center pixel also, are set to be 0.

Dilating the blurred N−1 number of images means that the luminance value of each pixel of each blurred image is multiplied by a matrix(M), the matrix(M) is shown as follows:

$$\text{matrix}(M) = \begin{bmatrix} 0 & 1 & 0 \\ 1 & 1 & 1 \\ 0 & 1 & 0 \end{bmatrix}.$$

Detecting edges from the dilated N−1 number of images means that the luminance value of each pixel of each dilated image is multiplied by a first matrix Sobel(V) and by a second matrix Sobel(H), then take a sum, and finally divided by two. Therefore, it can extract edges from each dilated image. The first matrix Sobel(V) and the second matrix Sobel(H) are shown as follows:

$$Sobel(V) = \begin{bmatrix} 1 & 0 & 1 \\ 1 & 0 & 1 \\ 1 & 0 & 1 \end{bmatrix} \text{ and}$$

$$Sobel(H) = \begin{bmatrix} 1 & 1 & 1 \\ 0 & 0 & 0 \\ 1 & 1 & 1 \end{bmatrix}$$

Rebinarizing the n−1 number of images after detecting edges means to compare the luminance value of each pixel of each image after detecting edges to a second predetermined threshold. If the luminance value of each pixel of each image after detecting edges is equal to or greater than the second predetermined threshold, the luminance value of each pixel of each image after detecting edges is set to be 255, otherwise the luminance value of each pixel of each image after detecting edges is set to be 0. The second predetermined threshold can be, and in one example is, 150.

Detecting objects from the rebinarized N−1 images means to extract objects from each of the rebinarized N−1 number images. Therefore moving objects in front of the video capture device 100 can be detected in the N−1 images through the object detecting module 22. In alternative embodiments, objects can be detected by other technologies known to those skilled in the art.

Figure 3:
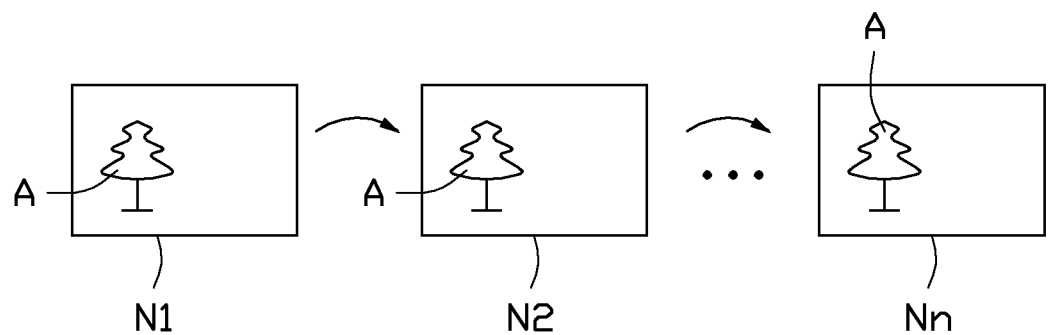
FIG. 3 is a schematic view showing N number of images captured in a first time interval from the moment t0 to the moment t1 in FIG. 2, wherein N is a positive integer.

For example, in FIG. 3, the video capturing device 100 captures N number of images during the first time interval T1 from the moment t0 to the moment t1. In each image, only a static object such a tree A is captured. The object detecting module 22 processes the second image N2 to the N-th image N relative to the first image N1 in each processed N−1 images (the second image N2 to the N-th image N). In this case, there is no difference between each image of the second N2 to the N-th image N and the first image N1. Therefore, no moving object is detected through the N number of the images in the first time interval T1 from the moment t0 to the moment t1. The object detecting module 22 outputs a first detection result to the predetermination module 23. The first detection result presents that there is no moving object detected through the N number of images in the first time interval T1 from the moment t0 to the moment t1. The predetermination module 23 predetermines that there will also be no moving object appearing in front of the video capturing device 100 in the second time interval T2 from the moment t1 to the moment t2 according to the first detection result. The Y number of images in the second time interval T2 from the moment t1 to the moment t2 are likely valueless for monitoring. Therefore, the quality of the Y number of images in the second time interval T2 from the moment t1 to the moment t2 can be decreased. The predetermination module 23 outputs a first predetermination signal to the switching module 24. The first predetermination signal presents there will also be no moving object appearing in front of the video capturing device 100 in the second time interval T2 from the moment t1 to the moment t2.

The switching module 24 switches off the AF module 13, the AE module 14, and the AWE module 15 in the second time interval T2 from the moment t1 to the moment t2 according to the first predetermination signal. Therefore, it can save power for the surveillance system 10 in the second time interval T2 from the moment t1 to the moment t2. In other examples, more than one static objects may be captured in the N number of images in the first time interval T1 from the moment t0 to the moment t1, in these cases, the object detecting module 22 also detects no moving object in the N number of images and outputs the first detection result.

Figure 4:
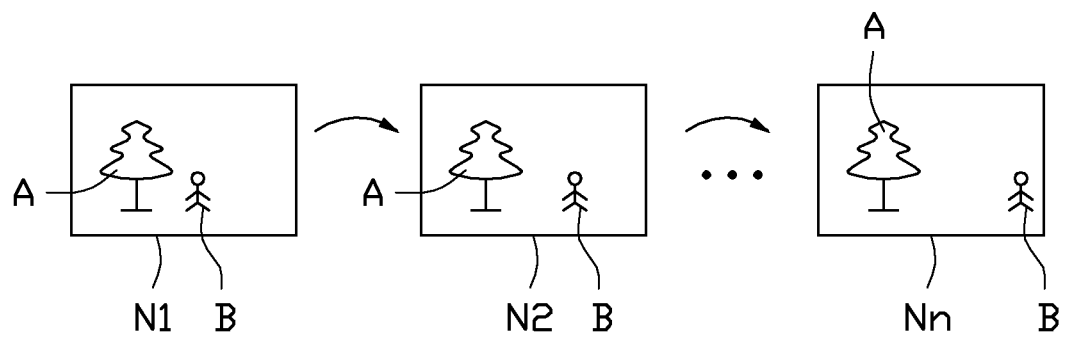
FIG. 4 is a schematic view showing N number of images captured in a second time interval from the moment t1 to the moment t2 in FIG. 2.

For example, in FIG. 4, the video capturing device 100 captures N number of images during the first time interval T1 from the moment t2 to the moment t3. In each image, a static object such as a tree A and a moving object such as a person B are captured. The object detecting module 22 processes the second image N2 to the N-th image N relative to the first image N1 in each processed N−1 images (i.e. the second image N2 to the N-th image N). In this case, the moving object (the person B) is detected through the N number of the images in the first time interval T1 from the moment t2 to the moment t3. The object detecting module 22 outputs a second detection result to the predetermination module 23. The second detection result presents there is a moving object that is detected through the N number of images in the first time interval T1 from the moment t2 to the moment t3. The predetermination module 23 predetermines that the moving object will also appear in front of the video capturing device 100 in the second time interval T2 from the moment t3 to the moment t4 according to the second detection result. The Y number of images in the second time interval T2 from the moment t3 to the moment t4 are likely valuable for monitoring. The quality of the Y number of images in the second time interval T2 from the moment t3 to the moment t4 is required to be the best. The predetermination module 23 outputs a second predetermination signal to the switching module 24. The second predetermination signal presents the moving object also will appear in front of the video capturing device 100 in the second time interval T2 from the moment t3 to the moment t4.

The switching module 24 switches on the AF module 13, the AE module 14, and the AWE module 15 in the second time interval T2 from the moment t3 to the moment t4 according to the second predetermination signal. In other examples, more than one static objects and/or more than on moving objects may be captured in the N number of images in the first time interval T1 from the moment t2 to the moment t3, in these cases, the object detecting module 22 also detects more than one moving objects in the N number of images and outputs the second detection result.

The first time interval T1 from the moment t4 to the moment t5 is similar to the first time interval T1 from the moment t0 to the moment t1 and the first time interval T1 from the moment t2 to the moment t3. The second time interval T2 from the moment t5 to the moment t6 is similar to the second time interval T2 from the moment t1 to the moment t2 and the second time interval T2 from the moment t3 to the moment t4.

If the detecting module 21 detects no moving object in the first time interval T1 from the moment t4 to the moment t5, the detecting module 21 outputs the first detection result, and the switching module 24 switches off the AF module 13, the AE module 14, and the AWE module 15 to save power. If the detecting module 21 detects any moving object in the first time interval T1 from the moment t4 to the moment t5, the detecting module 22 outputs the second detection result, and the switching module 24 switches on the AF module 13, the AE module 14, and the AWE module 15.

As mentioned-above, if the object detecting module 22 detects no moving object in each first time interval T1, the object detecting module 22 outputs the first detection result to the predetermination module 23, the predetermination module 23 outputs the first predetermination signal to the switching module 24 according to the first detection result, and the switching module 24 switching off the AF module 13, the AE module 14, and the AWE module 15 in the second time interval T2 next to a corresponding first time interval T2 according to the first predetermination signal. If the object detecting module 22 detects any moving object in each first time interval T1, the object detecting module 22 outputs the second detection result to the predetermination module 23, the predetermination module 23 outputs the second predetermination signal to the switching module 24 according to the second detection result, and the switching module 24 switching on the AF module 13, the AE module 14, and the AWE module 15 in the second time interval T2 next to a corresponding first time interval T1, according to the second predetermination signal. Therefore, it is unnecessary for the surveillance system 10 to continuously and simultaneously switch on the AF module 13, the AE module 14, and the AWE module 15, and power saving can be achieved.

While the disclosure has been described by way of example and in terms of embodiments, it is to be understood that the disclosure is not limited thereto. On the contrary, it is intended to cover various modifications and similar arrangements, which would be apparent to those skilled in the art. Therefore, the scope of the appended claims should be accorded the broadest interpretation so as to encompass all such modifications and similar arrangements.

It is also to be understood that above description and any claims drawn to a method may include some indication in reference to certain steps. However, the indication used is only to be viewed for identification purposes and not as a suggestion as to an order for the steps.

What is claimed is:

1. A surveillance system, comprising:
    a video capturing device comprising an auto focusing module, an auto exposure module, and an auto white balance module, the video capturing device capturing a number of images in a first time interval, the video capturing device also capturing a number of images in a second time interval next to the first time interval; and
    a power controller electrically connected to the video capturing device, the power controller comprising:
        an object detecting module for selecting one of the images captured in the first time interval as a reference image and processing the other images captured in the first time interval relative to the reference image to detect whether there is a moving object; and
        a switching module for switching off the auto focusing module, the auto exposure module, and the auto white balance module in the second time interval when the object detecting module detects that there is no moving object;
    wherein the object detecting module processes the other images as follows: differentiating the other images relative to the reference image; graying the differentiated images; binarizing the grayed images; blurring the binarized images; dilating the blurred images; detecting edges from the dilated images to extract the edges from each dilated image; rebinarizing the other images after the edges are detected; and detecting objects from the rebinarized images.

2. The surveillance system as claimed in claim 1, wherein the switching module switches on the auto focusing module, the auto exposure module, and the auto white balance module in the second time interval when the objecting detecting module detects that there is a moving object.

3. The surveillance system as claimed in claim 1, wherein the power controller comprises a timing module, when the video capturing device is turned on, the video capturing device starts to capture images along a time axis, the timing module is configured for timing when the video capturing device starts to capture the images and configured for dividing the time axis to a number of first time intervals and a number of second time intervals, each second time interval is next to two corresponding first time intervals.

4. The surveillance system as claimed in claim 3, wherein a length of each first time interval is one third of a length of each second time interval.

5. The surveillance system as claimed in claim 3, wherein when the detecting module detects that there is no moving object, the detecting module outputs a first detection result; when the detecting module detects that there is a moving object, the detecting module outputs a second detection result.

6. The surveillance system as claimed in claim 5, wherein the power controller comprises a predetermination module, when the predetermination module receives the first detection result, the predetermination module predetermines that there will no moving object appearing in the second time interval.

7. The surveillance system as claimed in claim 6, wherein when the predetermination module receives the second detection result, the predetermination module predetermines that there will be a moving object appearing in the second time interval.

8. The surveillance system as claimed in claim 1, wherein the reference image is the first image captured in the first time interval.

9. The surveillance system as claimed in claim 1, wherein the reference image is any one of the images captured in the first time interval.

10. The surveillance system as claimed in claim 1, wherein the number of the images captured in the first time interval is five.

* * * * *